United States Patent [19]
Garcia-Mallol

[11] Patent Number: 5,469,698
[45] Date of Patent: Nov. 28, 1995

[54] PRESSURIZED CIRCULATING FLUIDIZED BED REACTOR COMBINED CYCLE POWER GENERATION SYSTEM

[75] Inventor: Juan A. Garcia-Mallol, Morristown, N.J.

[73] Assignee: Foster Wheeler USA Corporation, Clinton, N.J.

[21] Appl. No.: 295,565

[22] Filed: Aug. 25, 1994

[51] Int. Cl.⁶ .................................................. F02C 6/00
[52] U.S. Cl. .................... 60/39.02; 60/39.12; 60/39.182; 60/39.52
[58] Field of Search ............................ 600/39.02, 39.12, 600/39.182, 39.52

[56] References Cited

U.S. PATENT DOCUMENTS

| | | | |
|---|---|---|---|
| 3,446,014 | 5/1969 | Foster-Pegg | 60/39.182 |
| 3,481,834 | 12/1969 | Squires | 60/39.182 |
| 3,863,606 | 2/1975 | Bryers et al. | 122/4 D |
| 4,223,529 | 9/1980 | Willyoung | 60/39.181 |
| 4,274,941 | 6/1981 | Janssen et al. | 60/39.12 |
| 4,313,300 | 2/1982 | Wilkes et al. | 60/39.52 |
| 4,424,766 | 1/1984 | Boyle | 122/4 D |
| 4,479,458 | 10/1984 | Goidich et al. | 122/4 D |
| 4,498,286 | 2/1985 | Brannstrom et al. | 60/39.1 |
| 4,688,521 | 8/1987 | Korenberg | 122/4 D |
| 4,741,290 | 5/1988 | Krieger et al. | 122/4 D |
| 4,748,940 | 6/1988 | Honig | 122/4 D |
| 4,779,574 | 10/1988 | Nilsson et al. | 122/4 D |
| 4,802,445 | 2/1989 | Robertson, Jr. | 60/39.12 |
| 4,809,623 | 3/1989 | Garcia-Mallol | 122/4 D |
| 4,809,625 | 3/1989 | Garcia-Mallol et al. | 122/4 D |
| 4,845,942 | 7/1989 | Schemenau et al. | 60/39.12 |
| 4,852,996 | 8/1989 | Knop et al. | 60/39.12 |
| 4,896,497 | 1/1990 | Pillai | 60/39.12 |
| 4,915,061 | 4/1990 | Garcia-Mallol | 122/4 D |
| 4,944,150 | 7/1990 | Östman | 60/39.182 |
| 5,218,815 | 6/1993 | Korenberg | 60/39.12 |
| 5,255,506 | 10/1993 | Wilkes et al. | 60/39.12 |
| 5,255,507 | 10/1993 | Gounder | 60/39.12 |
| 5,375,408 | 12/1994 | Daman | 60/39.02 |

FOREIGN PATENT DOCUMENTS 2180053  3/1987  United Kingdom ................ 60/39.52

Primary Examiner—Richard A. Bertsch
Assistant Examiner—Howard R. Richman
Attorney, Agent, or Firm—Marvin A. Naigur

[57] ABSTRACT

A combined cycle power generation system incorporates a carbonizer and a pressurized fluidized bed reactor for the generation of fuel gas and flue gases, respectively. A combustor is provided for the combustion of the fuel gas in the presence of the flue gases to produce hot gases. The hot gases are passed through a gas turbine where the gases expand and cool while performing work in the generation of electrical power. The exhaust gases from the gas turbine are passed though a heat recovery unit for the production of steam. The exhaust gases are then combined with air and passed to the pressurized fluidized bed reactor to provide excess secondary gas to aid in driving the gas turbine.

11 Claims, 1 Drawing Sheet

U.S. Patent
Nov. 28, 1995
5,469,698
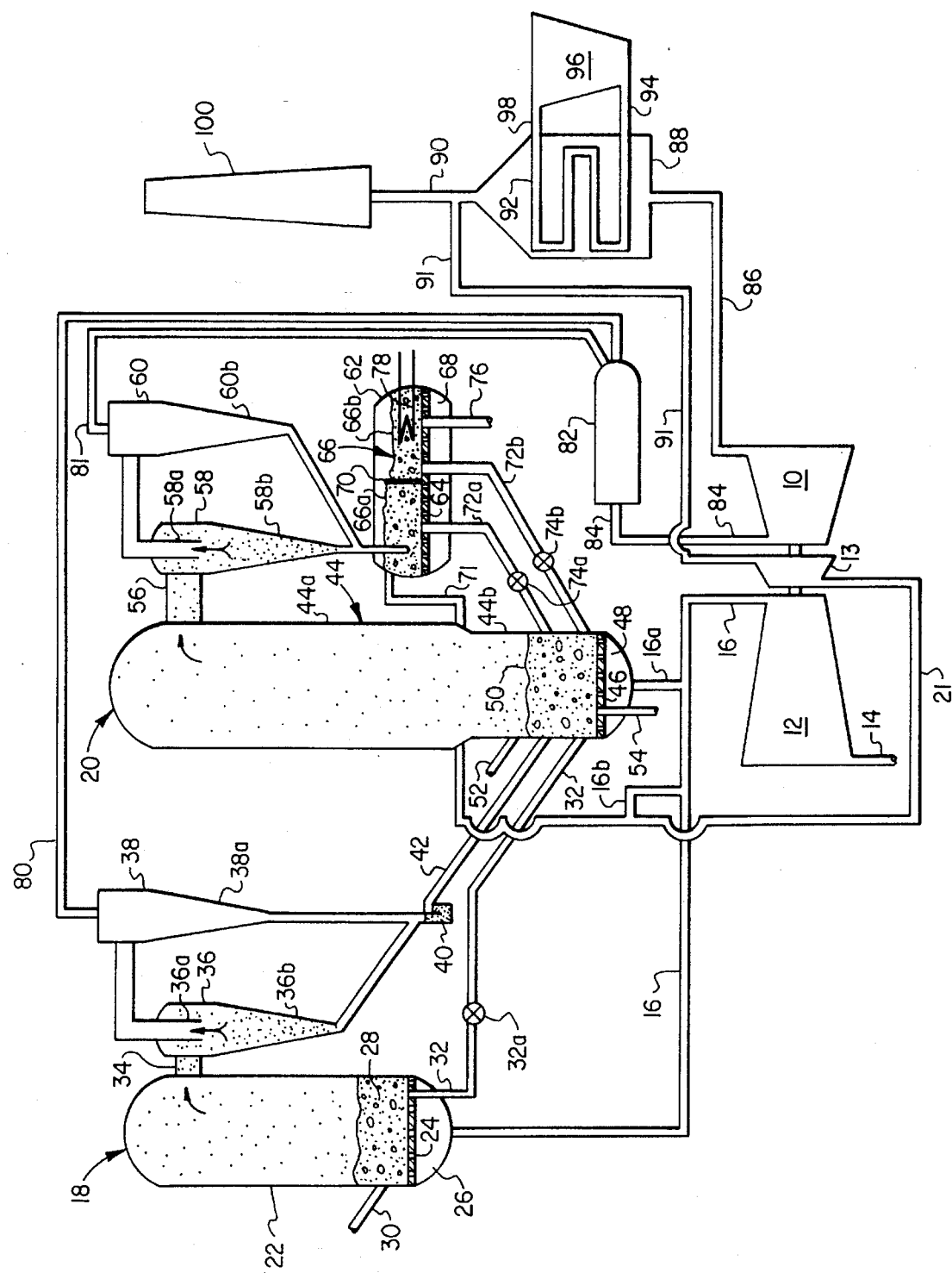

PRESSURIZED CIRCULATING FLUIDIZED BED REACTOR COMBINED CYCLE POWER GENERATION SYSTEM

BACKGROUND OF THE INVENTION

This invention relates to combined cycle power generation systems, and, more particularly, to such a system which incorporates a carbonizer to produce a low-Btu fuel gas which is combusted in a topping combustor to produce hot exhaust gas for the operation of a gas turbine.

Combined cycle power generation systems are well known in the art and typically involve the combustion of natural gas or oil under pressure for the generation of hot gases which are passed through a gas turbine where the gases expand and cool while performing work in the generation of electrical power. The turbine exhaust gases are passed to a heat recovery unit for the generation of high temperature steam which is used by steam turbines to perform additional work.

Combined cycle power generation systems typically have relatively high efficiency because the steam turbines operate at substantially lower temperatures than the gas turbine. Combined cycle systems, unfortunately, also require the use of premium fuels, such as natural gas or oil, for the operation of the gas turbine and are therefore considered too expensive for many industrial operations.

To increase the system efficiency and to lower the operational cost of combined cycle power generation systems, pressurized fluidized bed reactors have been incorporated in which a fluidized bed, burning a low cost fuel such as coal, is operated under a pressure of between approximately 10 to 15 atmospheres. The flue gases from the bed are passed through a cyclone separator and a ceramic cross-flow filter that operate to separate the entrained solids from the gases. The solids are returned to the reactor bed and the clean gases are passed through a gas turbine where energy is extracted as the gases cool and expand, before the gases are used to generate steam. A combined cycle system of this sort has a relatively high overall efficiency when compared to similar systems.

Unfortunately, pressurized circulating fluidized bed reactors and gas turbines have conflicting operational requirements for efficient system operation. For example, a gas turbine requires a relatively high-volume of high-temperature gases for efficient operation; however, a pressurized fluidized bed reactor burning a reactive fuel should be operated with a lower-volume of combustion supporting gas, to maintain the fuel particles at a temperature close to the gas and other solids temperature, for efficient absorption of SOx, to prevent the emission of NOx and alkaline gases, and to prevent agglomeration of particulate material. Consequently, it is difficult to integrate the operational requirements of a circulating pressurized fluidized bed reactor with those of a gas turbine and maintain a high efficiency, meet emission requirements and avoid agglomeration of particles in the fluidized bed reactor.

SUMMARY OF THE INVENTION

It is object of the present invention to provide a combined cycle system and method which incorporates a fuel gas generator for the production of fuel gas from relatively low cost fuels to drive a gas turbine.

It is further object of the present invention to provide a combined cycle system and method of the above type which incorporates a circulating pressurized fluidized bed reactor to provide hot gases to drive the gas turbine.

It is a further object of the present invention to provide a combined cycle system and method of the above type in which SOx is efficiently absorbed, the production of NOx and alkaline gases is minimized, and particulate material agglomeration is prevented in the circulating pressurized fluidized bed reactor.

It is a further object of the present invention to provide a combined cycle system and method of the above type in which a high efficiency is maintained, emission requirements are met, and agglomeration of particles is avoided in the fluidized bed.

Toward the fulfillment of these and other objects, according to the system and method of the present invention a carbonizer and a pressurized fluidized bed reactor are utilized for the generation of fuel gas and flue gases, respectively. A combustor is provided for the combustion of the fuel gas in the presence of the flue gases to produce hot gases that are passed through a gas turbine where the gases expand and cool while performing work in the generation of electrical power. The exhaust gases from the gas turbine are passed through a heat recovery unit for the production of steam. A portion of the relatively cool exhaust gases from the heat recovery unit is passed to an exhaust stack whale the remaining gases are further compressed and passed to the pressurized fluidized bed reactor to provide excess secondary gas to aid in driving the gas turbine.

BRIEF DESCRIPTION OF THE DRAWING

The above brief description, as well as further objects, features and advantages of the present invention will be more fully appreciated by reference to the following detailed description of the presently preferred but nonetheless illustrative embodiment in accordance with the present invention when taken in conjunction with the drawing which is a schematic diagram of the system of the present invention.

DESCRIPTION OF THE PREFERRED EMBODIMENT

In the schematic representation of the drawing a gas turbine is shown in general by the reference numeral 10 and is drivingly connected to an air compressor 12, an exhaust gas compressor 13, and an electrical generator (not shown) to drive same in a conventional manner. The air compressor 12 receives air from an inlet conduit 14 and compresses the air before passing the air through a conduit 16 extending from the outlet of the air compressor 12 and to a carbonizer 18 via an opening formed in the lower end portion thereof. A portion of the air is also passed through branch conduits 16a and 16b extending respectively from the conduit 16 to an opening in the lower end portion of a pressurized circulating fluidized bed reactor 20 and to an inlet port in a conduit 21, as will be described.

The carbonizer 18 includes a substantially cylindrical reactor vessel 22 with concave ends to form an air-tight enclosure. A perforated air distribution plate 24 is suitably supported at the lower portion of the vessel 22 and defines a plenum chamber 26 below the plate that receives pressurized air from the air compressor 12. The air introduced through the plenum chamber 26 passes in an upwardly direction through the plate 24 and may be preheated by air preheaters (not shown) and appropriately regulated by air control dampers (also not shown) as needed. The air distribution plate 24 is adapted to support a bed 28 of a particulate material consisting, in general, of crushed coal and limestone, or dolomite, for absorbing the sulfur formed during the carbonization and catalytic cracking of the coal.

A fuel distributor 30 extends through the wall of the reactor vessel 22 for introducing particulate fuel into the bed 28, it being understood that other distributors can be associated with the vessel 22 for distributing particulate adsorbent material and/or additional particulate fuel material into the bed 28, as needed.

A drain pipe 32 registers with an opening in the distribution plate 24 and extends through the plenum 26 and the wall of the vessel 22 for discharging to the reactor 20 any oversized material that may form in the vessel 22. A control valve 32a is disposed in the drain pipe 32 for regulating the discharge of oversized material.

A duct 34 registers with an opening formed in the upper portion of the reactor vessel 22 to provide communication between the vessel 22 and a high efficiency cyclone separator 36 disposed adjacent the vessel 22. The cyclone separator 36 includes a coaxially disposed inner tube 36a which, together with the wall of the separator, form an annular flow path for the fuel gas entering the separator from the reactor vessel 22. The latter gases swirl around in the annular path to separate a portion of the entrained solids therefrom by centrifugal forces in a conventional manner, before the gases are discharged through the inner tube 36a to an adjacent ceramic cross-flow filter 38. The filter 38 operates in a conventional fashion to separate the remaining portion of the entrained solids from the fuel gas. A cross-flow filters are well known in the art, the filter 38 will not b described in any further detail.

The separated solids in the separator 36 and the filter 38 drain by gravity into lower hopper portions 36b, 38a, respectively, which extend into a dipleg seal 40 disposed below the filter 38 and adjacent the lower end portion of the reactor 20. A conduit 42 extends from the dipleg seal 40 and registers with an opening in the lower end portion of the reactor 20, to pass coke and sorbent particulate material to the reactor. The dipleg seal 40 is designed to provide a pressure-differential seal between the reactor 20, and the cyclone separator 36 and the filter 38.

The reactor 20 includes a substantially cylindrical reactor vessel 44 with concave ends to form an air-tight enclosure. The vessel 44 has an upper section 44a that has an enlarged diameter, or cross-sectional area, relative to the lower section 44b. According to a preferred embodiment, the ratio of the cross-sectional area of the lower section 44b to the cross-sectional area of the upper section 44a is 0.75 and can vary from between 0.65 to 1 and 0.90 to 1, for reasons that will be explained later.

A perforated air distribution plate 46 is suitably supported at the lower portion of the vessel 44 and defines a plenum chamber 48 below the plate which receives pressurized air from the compressor 12. The air introduced through the plenum chamber 48 passes in an upwardly direction through the plate 46 and may be preheated by air preheaters (not shown) and appropriately regulated by air control dampers (also not shown) as needed. The air distribution plate 46 is adapted to support a bed 50 of particulate material consisting, in general, of crushed coal, coke, and limestone, or dolomite, for absorbing the sulfur formed during the combustion of the coke and coal.

A fuel distributor 52 extends through the wall of the reactor vessel 44 for introducing particulate fuel in addition to the coke and sorbent material introduced by the conduit 42 into the bed 50, it being understood that other distributors can be associated with the vessel 44 for distributing particulate sorbent material and/or additional particulate fuel material into the bed 50, as needed.

A drain pipe 54 registers with an opening in the distribution plate 46 and extends through the plenum 48 and the wall of the lower portion of the vessel 44 for discharging spent fuel and sorbent material from the bed 50 to external equipment (not shown).

A duct 56 registers with an opening formed in the upper portion of the reactor vessel 44 to provide communication between the vessel 44 and a high-efficiency cyclone separator 58 disposed adjacent the vessel 44. The cyclone separator 58 includes a coaxially disposed inner tube 58a which, together with the wall of the separator, form an annular flow path for the flue gases entering the separator from the reactor vessel 44. The latter gases swift around in the annular path to separate the entrained solids therefrom by centrifugal forces in a conventional manner, before the gases are discharged through the inner tube 58a to an adjacent ceramic cross-flow filter 60. The filter 60 operates in a conventional fashion to separate the remaining portion of the entrained solids from the fuel gas. As cross-flow filters are well known in the art, the filter 60 will not be described in any further detail.

The separated solids from the separator 58 and the filter 60 fall into lower hopper portions 58b, 60b of the separator and the filter, respectively, which extend into a substantially cylindrical, heat exchange vessel 62 disposed below the separator 58 and the filter 60, and adjacent the lower end of reactor vessel portion 44a. An air distribution plate 64 is disposed in the lower portion of the vessel 62 and supports a bed 66 of particulate material. An air plenum 68 is defined in the vessel 62 below the plate 64 to introduce air received from an external source (not shown) through the plate 64 and into the interior of the vessel 62. A partition wall 70 is attached to, and extends perpendicular from, the plate 64 to approximately the middle of the vessel 62 so as to divide the bed 66 into two beds 66a and 66b for purposes that will be discussed later. A gas duct 71 passes the fluidizing air from the beds 66a and 66b to the base of the upper section 44a of the vessel 44. Two recycle pipes 72a and 72b pass the separated particulate material from vessel 62 back to the bed 50 in the vessel 44 with the flow being appropriately regulated by two control valves 74a and 74b respectively, as needed. A drain pipe 76 discharges particulate material from the vessel 62, and a bank of heat exchange tubes 78 is disposed in the vessel 62 for circulating a cooling fluid, such as water, through the interior of the vessel 62 to cool the bed 66b for reasons that will be explained later.

The heat exchange vessel 62 operates to transfer heat from the separated solid material received from the separator 58 and the ceramic cross-flow filter 60 to water flowing through heat exchange tube bank 78. An example of a heat exchange vessel connected to a pressurized circulating fluidized reactor is the subject of a co-pending patent application entitled, "A Fluidized Bed System And Method Of Operating Same Utilizing An External Heat Exchanger," Ser. No. 08/295,565 assigned to the assignee of the present invention and included herein by reference.

A conduit 80 registers with an opening in the upper end portion of the cross-flow filter 38, and extends to a first gas inlet of a topping combustor 82. Similarly, a conduit 81 registers with an opening in the upper end portion of the cross-flow filter 60, and extends to a second gas inlet of the topping combustor 82. The topping combustor 82 operates in a conventional manner to combust the fuel gas from the filter 38, and therefore the carbonizer 18, in the presence of the flue gases from the filter 60 and therefore the reactor 20, to produce hot gases. The gas outlet of the combustor 82 is connected, by a conduit 84, to the inlet of the gas turbine 10, and the hot exhaust gases from the outlet of the turbine 10 are passed, by a conduit 86, to a heat recovery unit 88.

The heat recovery unit 88 includes a superheater 92 that operates to transfer heat from the hot exhaust gases received from the gas turbine 10 to steam flowing through the superheater so that the temperature of the steam is increased to a predetermined temperature.

The steam outlet of the superheater 92 is connected, by a conduit 94, to the steam inlet of a high pressure steam turbine 96 which operates in a conventional manner to produce electrical power. The steam outlet of the high pressure steam turbine 96 is connected, by a conduit 98, to the superheater 92. There are several connections that are common to the high pressure steam turbine 96 which are not shown in the drawing for the convenience of presentation since they are conventional.

An exhaust gas conduit 90 connects the heat recovery unit 88 to an exhaust stack 100, and a conduit 91 extends from the conduit 90 to an inlet in the exhaust gas compressor 13 which operates to compress the exhaust gas. The exhaust gas is then passed to the conduit 21 and combined with air, from the air compressor 12, injected into the conduit 21, via the conduits 16 and 16b, to form secondary gas which is then passed to an inlet in the wall of the reactor vessel 44, which inlet is formed at a predetermined elevation above the bed 50. It is understood that additional gas conduits may register with additional inlets provided through the walls of the reactor 20 at other elevations, as needed.

In operation, a quantity of fuel and sorbent particles, such as coal and limestone, is introduced into the carbonizer 18 through the distributor 30 and builds up on the upper surface of the plate 24. The particles are ignited by burners (not shown), air is introduced into the plenum 26 at a relatively high pressure, and a pressure of 13–15 atmospheres is established in the carbonizer 18. The velocity of the air introduced, via the air plenum 26, through the distributor plate 24 and into the interior of the carbonizer 18 is established in accordance with the size of the particulate material in the carbonizer 18 so that a fluidized bed is formed, that is, the particulate material is fluidized to an extent that substantial entrainment of the particulate material in the bed is achieved.

The amount of relatively fine and coarse coal and limestone particles introduced to the bed 28 by the distributor 30 is such that the gas column formed in the carbonizer 18 above the bed 28 is saturated with the solid particles, that is, maximum entrainment of the solid particles by the gas is attained. As a result of the saturation, a portion of the fine particles are not entrained by the gas and, together with the relatively coarse particles, form a discrete bed 28 in the carbonizer 18 which exhibits a relatively high percentage volume of particles, such as 20% to 30% of the total volume, when operating at maximum capacity.

The quantity of air supplied through the plenum 26 is regulated so that only a fraction of the total oxygen required for complete combustion of the coal is supplied, resulting in the pyrolysis or carbonization of the coal at a bed temperature in the range of approximately 1470°–1500° F., producing thereby a low BTU fuel gas.

The mixture of entrained particles and fuel gas rises, forming the gas column, and passes from the vessel 22 through the duct 34 and into the cyclone separator 36. A portion of the fine particles are separated from the fuel gas in the separator 36 and are passed to the dipleg seal 40, and the remaining portion of the fine particles are separated by the filter 38 and are also passed to the dipleg seal. The clean fuel gas is discharged through the conduit 80 to the combustor 82.

The separated fine particles in the dipleg seal 40 are injected via the conduit 42, along with fuel and sorbent material via the distributor 52, into the reactor 20 to form the bed 50. Air from the compressor 12 is introduced into the plenum 48 via the conduits 16, 16a at a relatively high pressure, and a pressure of 13–15 atmospheres is established in the reactor 20. This air supplies a fraction of the total oxygen required for complete combustion of the coke and coal so that the combustion in the lower portion of the vessel 44 is incomplete, and thus operates under reducing conditions to produce pyrolytic gases. When operating at maximum capacity, the oxygen content in the air supplied through the plenum 48 can be from 80 to 100% of the theoretical oxygen required for combustion.

Secondary gas from the conduit 21 is introduced into the vessel 44 above the bed 50 to supply the remaining fraction of the total oxygen required to complete the combustion of the pyrolytic gases, and thus the upper portion of the reactor 20 operates under oxidizing conditions to produce flue gas. When operating at maximum capacity, the oxygen content of the air supplied through the conduit 21 can be from 5 to 25% which, in addition to the oxygen supplied through the plenum 48, provides a total of 105% of the oxygen required for complete combustion. Thus, the reactor 20 is provided an excess of 5% oxygen of that required for complete combustion for reasons that will be discussed.

The high-pressure combustion-supporting gas introduced into the reactor 20 through the plate 46 from the plenum 48 causes the relatively fine particles of coal, coke, and limestone including coal ash and spent limestone, to become entrained within, and to thus be pneumatically transported by, the combustion gas. This mixture of entrained particles and gas rises upwardly within the reactor 20 to form a gas column containing the entrained solids and passes from the reactor 20 through the duct 56 and into the cyclone separator 58. The velocity of the air introduced, via the air plenum 48, through the distributor plate 46 and into the interior of the reactor vessel 44 is established in accordance with the size of the particulate material in the reactor 20 so that a circulating fluidized bed is formed, that is the particulate material is fluidized to an extent that substantial entrainment of the particulate material in the bed is achieved.

The amount of relatively fine and coarse coke, coal and limestone particles introduced to the bed 50 by the conduit 42 and the distributor 52 is such that the gas column formed in the reactor vessel 44 above the bed 50 is saturated with the solid particles, i.e. maximum entrainment of the solid particles by the gas is attained. As a result of the saturation, a portion of the fine particles is not entrained by the gas and, together with the relatively coarse particles, form the bed 50 which exhibits a relatively high percentage volume of particles, such as 20% to 30% of the total volume, when operating at maximum capacity.

The mixture of the gases and entrained fine particles are passed from vessel 44 to the separator 58 where a portion of the fine particles are separated from the flue gases. The remaining portion of the entrained fine particles and flue gases are discharged through the inner tube 58a to the filter 60 where a greater portion of the remaining fine particles are separated from the gases. The separated fine particles are then passed from the separator 58 and the filter 60 to the heat exchange vessel 62 in which they form the beds 66a and 66b.

The heat exchange tubes 78 in the heat exchange vessel 62 remove heat from the particles forming the bed 66b in a conventional manner such that the bed 66b is substantially cooler than the bed 66a. The ratio of hot fine particles to cool fine particles returned to the bed 50 is controlled by the valves 74a and 74b which respectively control the flow of relatively hot particles and relatively cool particles through the pipes 72a and 72b, thus providing regulation of the temperature of the bed 50.

The introduction of the mixture of fine and coarse particles into the reactor 20 through the conduit 42 and the distributor 52 is controlled so that the mixture is maintained at proper levels to insure that a predetermined particle-to-gas ratio is maintained and that the gas column above the bed 50 is saturated with the particles, notwithstanding the discharge of the coarse particles from the drain pipe 54 and the discharge of a portion of the fine particles from the drain pipe 76 of the heat exchange vessel 62.

The flue gases from the reactor 20, the separator 58 and the filter 60, are introduced, via the branch conduit 81, to the combustor 82 which also receives fuel gas from the carbonizer 18, the separator 36, and the filter 38 via the conduit 80. In the combustor 82, the fuel gas is combusted in the presence of the 5% excess oxygen in the flue gases in order to raise the temperature of the gases in the combustor 74 to a predetermined temperature of, for example, 2000° F. The gaseous products of combustion are then passed from the combustor 82 to the gas turbine 10 to drive same and to enable the turbine 10 to drive the air compressor 12, the exhaust gas compressor 13, and an electrical generator (not shown). The exhaust gases from the turbine 10 are passed, via the conduit 86, to the heat recovery unit 88 for the generation of high pressure steam to drive the steam turbine 96.

A portion of the cooled turbine exhaust gas is passed, via the conduit 90, from the heat recovery unit 88 to the exhaust stack 100, and another portion is passed, via the conduit 91, to the exhaust gas compressor 13 before being passed to the conduit 21. Air from the air compressor 12 is passed, via the conduit 16 and the branch conduit 16b, to the conduit 21 and combined with the gas in the latter conduit, forming secondary gas, which is then passed to the reactor vessel 44a for reheating. The secondary gas is supplied to the reactor 20 in the foregoing manner at between 200% and 240% of the stoichiometric amount of air, as required for the operation of the gas turbine 10, with this amount varying accordingly to achieve the desired exit gas temperature of 1600° F.

Due to the enlarged cross-sectional area of the reactor vessel upper section 44a, the secondary gas supplied to that section increases the velocity of the flue gases therein only slightly, thereby limiting the erosion of surfaces in that section. In order to limit the rate of exothermic reactions, the final amount of gas corresponds to about 300% of the stoichiometric amount while the amount of reacting gas is limited to slightly above the exact stoichiometry.

The system and method of the present invention has several advantages over the prior art. For example, the reactor 20 can utilize relatively inexpensive high sulfur coal for combustion and supplies a substantial portion of the energy required for the operation of both the gas turbine 10 and the steam turbine 96 for the production of electrical power. In addition, the incorporation of the carbonizer 18 provides for the production of fuel gas from relatively low cost fuels, such as coal, to provide the additional energy required to drive the gas turbine 10. Further, the exhaust gases from the turbine 10 are supplied to the heat recovery unit 88 for the production of steam to drive the steam turbine 96, resulting in the recovery of the thermal energy stored in the exhaust gases.

Further, the temperature of the bed 50 can be varied by varying the amount of air supplied to the bed. The majority of the reactions, including combustion in particular, between solids and gases, occur in the lower vessel section 44b, thereby minimizing the formation of nitrogen oxides and alkaline gases, and maximizing the absorption of sulfur oxides. Also, the staging of secondary gas aids to minimize the production of nitrogen oxides.

Still further, the discharge of relatively fine bed materials through the drain pipe 76 and relatively coarse materials through the drain pipe 54 enables the ratio of the relatively coarse to the relatively fine particulate materials to be regulated in the reactor vessel 20. Consequently, the residence time of both the relatively coarse and the relatively fine particulate material disposed in, and circulating through, the reactor vessel 20 can be adjusted to suit their respective reacting characteristics which provides for increased operational efficiency.

Although not specifically illustrated in the drawing, it is understood that additional necessary equipment will be provided, and that these and all components described above are arranged in an appropriate fashion to form a complete and operative system.

It is understood that variations may be made in the method of the present invention without departing from the scope of the invention. For example, electric precipitators can be substituted for ceramic cross-flow filters and a pyrolysis vessel or a fuel gas generator could be substituted for the carbonizer.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of generating power using a combined cycle system comprising the following steps:

producing fuel gas having solid fuel particles entrained therein;

separating said fuel gas from said solid fuel particles;

burning said solid fuel particles with air in a reactor to produce flue gases having solid particles entrained therein;

separating said flue gases from said latter solid particles;

passing said latter solid particles to a heat exchanger for cooling a portion of said latter solid particles;

passing said cooled portion of said particles and the remaining portion of said particles from said heat exchanger back to said reactor, the ratio of said cooled portion of said particles to said remaining portion of said particles being adjustable to control the temperature of said reactor;

combusting said fuel gas in the presence of said flue gases in a combustor to produce gaseous products of combustion;

passing said gaseous products of combustion from said combustor to a gas turbine to drive said turbine and generate electrical energy;

utilizing heat from the exhaust gases from said turbine to produce steam; and passing said steam to a steam turbine to drive said steam turbine and produce electrical energy.

2. The method of claim 1 wherein said reactor has an upper portion and a lower portion, said upper portion having a greater cross sectional area than said lower portion, and said method further comprises:

apportioning the cooled exhaust gases from said gas turbine into a first portion and a second portion;

passing said first portion of said cooled exhaust gases to an exhaust stack;

compressing said second portion of said cooled exhaust gases;

forming secondary gases by injecting air into said compressed exhaust gases; and injecting said secondary gases into said upper reactor portion so that said secondary gas completes combustion.

3. The method of claim 2 wherein the step of separating said fuel gas from said solid fuel particles includes the following steps:

substantially separating said fuel gas from said solid fuel particles;

substantially filtering said substantially separated fuel gas; and wherein the step of separating said flue gases from said solid particles produced in said reactor includes the following steps:

substantially separating said flue gases from said solid particles produced in said reactor; and substantially filtering said substantially separated flue gases.

4. The method of claim 3 wherein the step of producing is performed in a carbonizer, and said method further comprises the step of controlling the residence time of said solid fuel particles in said carbonizer by draining said solid fuel particles from said carbonizer and passing said solid fuel particles to said reactor.

5. The method of claim 1 wherein said flue gases contain oxygen and wherein said step of combusting is in the presence of said oxygen.

6. The method of claim 1 wherein said particles are cooled in said heat exchanger by the steps of apportioning said solid particles in said heat exchanger into a first portion and a second portion, fluidizing said particles in said first and second portions, and cooling said first portion.

7. A combined cycle power generation system comprising:

a carbonizer for producing fuel gas having solid fuel particles entrained therein;

first separating means for substantially separating said fuel gas from said solid fuel particles passing from said carbonizer;

a pressurized fluidized bed reactor for receiving said solid fuel particles from said first separating means, said reactor burning said solid fuel particles with air to produce flue gases having solid particles entrained therein;

second separating means for substantially separating said flue gases from said solid particles passing from said reactor;

a heat exchanger for receiving the separated solid particles from said second separating means and for cooling a portion of said latter particles; means for passing said cooled portion of said particles and the remaining portion of said particles from said heat exchanger back to said reactor, the ratio of said cooled portion of said particles to said remaining portion of said particles being adjustable to control the temperature of said reactor;

a combustor for combusting said fuel gas in the presence of said flue gases to produce gaseous products of combustion;

a first turbine for receiving and utilizing said gaseous products of combustion to produce torque for the generation of electrical energy;

means connected to said first turbine for receiving hot exhaust gases from said first turbine and for utilizing said hot exhaust gases to produce steam; and a second turbine for receiving and utilizing said steam to produce torque for the generation of electrical energy.

8. The system of claim 7 wherein said reactor has an upper portion and a lower portion, said upper portion having a greater cross sectional area than said lower portion, and said system further comprises:

an exhaust stack;

an exhaust gas compressor;

means for passing a portion of said exhaust gases from said first turbine to said exhaust gas compressor for compressing said exhaust gases, and for passing another portion of said exhaust gases from said first turbine to said exhaust stack;

means for producing secondary gases by injecting air into said compressed exhaust gases; and means for injecting said secondary gases into said upper reactor portion so that said secondary gas completes combustion.

9. The system of claim 8 wherein said first separating means includes:

a first cyclone separator for receiving from said carbonizer, and substantially separating, said fuel gas and said solid fuel particles;

a first ceramic cross-flow filter for receiving from said first cyclone separator, and filtering, said substantially separated fuel gas, passing thereby substantially pure fuel gas to said combustor and passing substantially separated and filtered solid fuel particles to said lower portion of said reactor; and wherein said second separating means includes:

a second cyclone separator for receiving from said reactor, and substantially separating, said flue gases and said solid particles; and a second ceramic cross-flow filter for receiving from said second cyclone separator, and filtering, said substantially separated flue gases, passing thereby substantially pure flue gases to said combustor and passing substantially separated and filtered solid particles to said heat exchanger.

10. The system of claim 9 further comprising means for draining said solid fuel particles from said heat exchanger and passing said drained solid fuel particles to said reactor to control the residence time of said solid fuel particles in said reactor.

11. The system of claim 7 wherein said heat exchanger comprises a vessel having an air distribution plate arranged to form a plenum in a lower portion of said heat for consistency and a chamber in an upper portion of said heat exchanger, said chamber having a partition wall extending upwardly from said plate to form first and second portions of said chamber for receiving said solid particles from said second separating means, said plenum adapted to receiveair to fiuidize said particles, and means for cooling particles in said first portion of said chamber to fore said cooled portion of said particles.

* * * * *